(No Model.)
J. B. URSBRUCK.
NUT LOCK.
No. 333,362. Patented Dec. 29, 1885.
FIG. I.
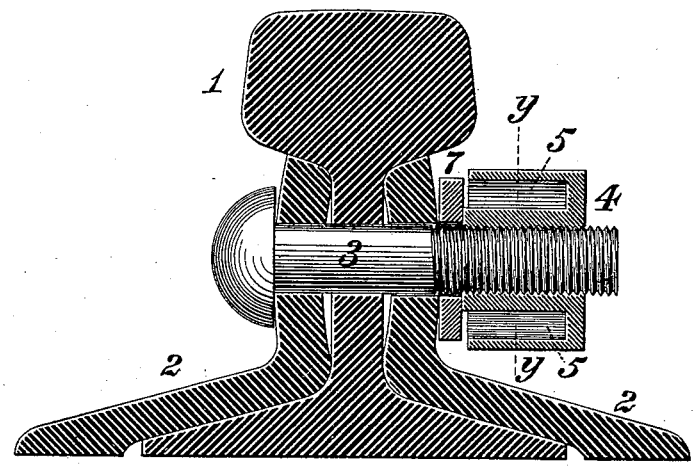
FIG. 2.
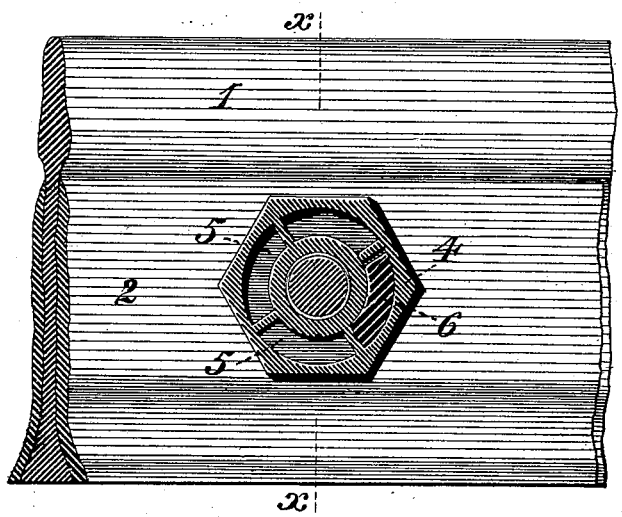
FIG. 3.
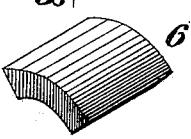
WITNESSES:
C. M. Clarke
N. M. Wilson
INVENTOR,
Joseph B. Ursbruck,
BY J. Snowden Bell,
ATTORNEY

# UNITED STATES PATENT OFFICE.

JOSEPH B. URSBRUCK, OF PHILADELPHIA, PENNSYLVANIA.

NUT-LOCK.

SPECIFICATION forming part of Letters Patent No. 333,362, dated December 29, 1885.

Application filed August 24, 1885. Serial No. 175,166. (No model.)

*To all whom it may concern:*

Be it known that I, JOSEPH B. URSBRUCK, of the city and county of Philadelphia, in the State of Pennsylvania, have invented a certain new and useful Improvement in Nut-Locks, of which improvement the following is a specification.

The object of my invention is to enable a nut to be held securely upon its bolt and prevented from being slackened or displaced by jars or concussions to which it may be subjected in service; to which end my invention, generally stated, consists in the combination, with a screw-bolt, of a recessed or chambered nut, and a locking-weight fitting in one of the recesses of the nut and serving to oppose by its gravity the tendency of the nut to turn upon the bolt in the direction of release from its bearing upon the member which the bolt secures in position.

The improvement claimed is hereinafter fully set forth.

In the accompanying drawings, Figure 1 is a vertical transverse section through a rail-joint illustrating the application of my invention at the line *x x* of Fig. 2; Fig. 2, a side view, in elevation, of the same with the bolt and nut in section at the line *y y* of Fig. 1, and Fig. 3 an isometrical view of the weight detached.

My invention is herein shown as applied in connection with a rail-joint, but is obviously equally applicable in any other construction in which it is necessary or desirable to hold a nut securely against displacement from normal position upon a bolt.

The bolt 3, by which the fish-plates 2 and rail-sections 1 are connected, is provided with an ordinary screw-thread, which is engaged by a nut, 4, exteriorly of the usual form, but differing from the ordinary nut, in having a series of recesses or chambers, 5, formed within its body between a central core in which the thread is tapped and an external shell, said chambers being separated by radial ribs or partitions, which assist in maintaining proper strength in the nut. The chambers 5 are preferably, as shown, of segmental form, and either of them is adapted to receive a correspondingly-shaped locking-weight, 6, which is inserted in one of the chambers, which, when the nut is screwed to a bearing against one of the fish-plates 2, or, as is usually the case, against an interposed washer, 7, will stand partially or wholly below the axis of the bolt, with its lower end in advance in the direction of the rotation of the nut in being screwed onto the bolt.

It will be seen that the tendency of the nut to be jarred loose and be displaced by rotating in the opposite direction is counterbalanced by the preponderance of gravity induced on one side of the bolt by the weight 6, and the nut will thereby be held in operative position without the use of a lock-nut, ratchet, or other extraneous device.

I am aware that a gravitating nut having a lateral extension or projection, or having its threaded opening located eccentrically, has been heretofore proposed, and such device, therefore, broadly, I disclaim. Such constructions are objectionable, in the particular of either presenting a projecting portion, which prevents the effective use of a wrench, and is liable to interference with adjacent parts, or of being unduly weak on one side, unless made so large as to entail a waste of metal and require increased clear space for use.

My improvement presents a light and strong skeleton nut of the usual form, adaptable to the ordinary screw-threads, and capable of being attached and removed by any common wrench without requiring extraneous devices in its application and use.

I claim as my invention and desire to secure by Letters Patent—

1. A skeleton nut composed of a central core, an external shell, and a series of radial ribs or partitions extending from the core to the shell, and dividing the open space between the core and shell into a series of chambers, each adapted to receive a locking-weight, substantially as set forth.

2. The combination of a screw-bolt, a chambered or recessed nut engaging the thread thereof, and a locking-weight fitting in one of the chambers of the nut, substantially as set forth.

JOSEPH B. URSBRUCK.

Witnesses:
JOHN URSBRUCK,
J. R. MASSEY.